United States Patent

Inada

[11] Patent Number: 5,497,674
[45] Date of Patent: Mar. 12, 1996

[54] INDUSTRIAL ROBOT

[75] Inventor: Takahiro Inada, Kakogawa, Japan

[73] Assignee: Kawasaki Jukogyo Kabushiki Kaisha, Hyogo, Japan

[21] Appl. No.: 291,503

[22] Filed: Aug. 17, 1994

Related U.S. Application Data

[63] Continuation-in-part of Ser. No. 60,045, May 13, 1993, abandoned, which is a continuation-in-part of Ser. No. 710,001, Jun. 4, 1991, abandoned.

[51] Int. Cl.$^6$ ............................. B25J 18/00; B25J 17/02
[52] U.S. Cl. ................... 74/490.03; 74/490.04; 901/15; 901/21; 901/23; 901/29
[58] Field of Search ................. 74/469, 490.01, 74/490.03, 490.06; 901/15, 19, 21, 22, 23, 24, 28; 414/744.3

[56] References Cited

U.S. PATENT DOCUMENTS

| | | | |
|---|---|---|---|
| 3,826,383 | 7/1974 | Richter | 214/1 BD |
| 4,298,308 | 11/1981 | Richter | 414/730 |
| 4,398,863 | 8/1983 | Shum | 901/23 X |
| 4,502,830 | 3/1985 | Inaba et al. | 414/735 |
| 4,507,046 | 3/1985 | Sugimoto et al. | 414/735 |
| 4,547,120 | 10/1985 | Turner, Jr. et al. | 414/744 R |
| 4,555,217 | 11/1985 | Wright | 901/23 X |
| 4,557,662 | 12/1985 | Terauchi et al. | 414/744 R |
| 4,589,816 | 5/1986 | Eberle et al. | 901/23 X |
| 4,600,355 | 7/1986 | Johnson | 901/21 X |
| 4,601,635 | 7/1986 | Ito et al. | 414/730 |
| 4,606,695 | 8/1986 | Lenz | 901/23 X |
| 4,659,279 | 4/1987 | Akeel et al. | 414/680 |
| 4,668,146 | 5/1987 | Ageta | 414/4 |
| 4,696,202 | 9/1987 | Jinriki et al. | 74/479 BW |
| 4,698,568 | 10/1987 | Nishizawa et al. | 901/49 X |
| 4,732,527 | 3/1988 | Nakashima et al. | 414/730 |
| 4,784,010 | 11/1988 | Wood et al. | 901/23 X |
| 4,897,015 | 1/1990 | Abbe et al. | 901/21 X |
| 4,984,745 | 1/1991 | Akeel et al. | 901/49 X |

FOREIGN PATENT DOCUMENTS

| | | | |
|---|---|---|---|
| 240438 | 10/1987 | European Pat. Off. | 901/29 |
| 3326962 | 2/1985 | Germany | 901/21 |
| 3713469 | 11/1988 | Germany | 901/15 |
| 3924537 | 2/1991 | Germany | 901/23 |
| 2-232193 | 9/1990 | Japan | 901/15 |

Primary Examiner—Allan D. Herrmann
Attorney, Agent, or Firm—Oliff & Berridge

[57] ABSTRACT

A base end portion of a lower arm is mounted on a revolutionarily drivable revolution portion at a specific offset from the revolutionary axis thereof, and an upper arm is mounted in the lower arm, with the lower and upper arms being rotationally drivable within a plane parallel to the revolutionary axis. In a motor casing, three motors for driving three dimensional motions of a wrist are disposed in a vertical direction with their axes being in parallel. Since the upper arm is offset from the revolutionary axis, both right-handed operation and left-handed operation can be easily selected, and the work range of this robot can be increased while its installation space can be reduced. The lower arm has a motor for driving the upper arm at the lower part thereof apart from a gearbox for the upper arm. Power of the motor for driving the upper arm is transmitted to the gearbox through a power transmission member. Such structure enables to reduce thickness of the lower arm.

4 Claims, 7 Drawing Sheets

INDUSTRIAL ROBOT

This is a continuation-in-part application of Ser. No. 060,045 filed on May 13, 1993, now abandoned which is a continuation-in-part application of Ser. No. 710,001 filed on Jun. 4, 1991, now abandoned.

BACKGROUND OF THE INVENTION

The present invention relates to an industrial robot particularly suitable, for example, for painting or sealing the body of an automobile.

An industrial robot of typical conventional technology is shown in FIG. 6, with FIG. 7 showing a back view thereof as seen from the right of FIG. 6. With this industrial robot 1, a revolution portion 4 on a base 3 fixed to an installation surface 2 such as a floor is revolutionarily driven about a vertical revolutionary axis 5, a base end portion of a lower arm 7 is provided so as to be rotatably driven about a horizontal fore-and-aft axis 6 in the revolution portion 4, and an upper arm 9 is provided so as to be rotatably driven about a horizontal up-and-down axis 8 at a free end portion of the lower arm 7. A longitudinal axis 10 of the upper arm 9 lies within a plane passing through the revolutionary axis 5, and thus the upper arm 9 has no offset with respect to the revolutionary axis 5.

Problems associated with the use of the conventional industrial robot 1 shown in FIGS. 6 and 7 when it is working on an automobile body 11 are described below with reference to FIGS. 8A to 8C. As shown in the plan views of FIGS. 8A to 8C, the automobile body 11 is moved in the direction of an arrow 12 by a conveyor. The industrial robot 1 is provided to one side of the path of the automobile body 11 as it is moved by the conveyor, and it performs a painting or sealing operation thereon.

As shown in FIG. 8A, when the industrial robot 1 works on the interiors of an engine compartment 13 of the automobile body 11, having a hood 15 that covers the engine compartment 13 and is openable about a hinge 14 having a horizontal axis, a side edge 15a of the hood 15 or a side portion 13a of the engine compartment 13 can easily impede the upper arm 9 of the industrial robot 1. To prevent this interference, the upper arm 9 must enter the engine compartment 13 from the front thereof (the left in FIG. 8A), but if the installation position of the industrial robot 1 is moved in the direction of an arrow 17 to enable this entry, the automobile body 11 will interfere with the revolution portion 4 of the automobile body 11 as the automobile body 11 is conveyed in the direction of the arrow 12.

If the industrial robot 1 is moved in the direction of an arrow 18 and set thereat, a portion of the automobile body 11 indicated by 19 will be outside the operating range of the industrial robot 1. Therefore, it is difficult for a single unit of the conventional type of industrial robot 1 to work on the front portion of an automobile body 11, so there is no alternative but to position two industrial robots 1 symmetrically to the left and right (top and bottom in FIG. 8A) of the automobile body 11, and divide the work therebetween.

In order to work on a front floor 20 and a dashboard 21 within the passenger compartment when an industrial robot 1 is positioned to one side of the automobile body 11, as shown in FIG. 8B, a front door 24 is opened and the upper arm 9 of the industrial robot 1 is inserted through the opening 25 of the front door 24. When the industrial robot 1 is operating in a region 22 within the rear compartment, a door pillar 23 of the automobile body 11 may impede the upper arm 9 of the industrial robot 1 and thus make work impossible. A two-door automobile body 11 causes particular problems because there is no rear door opening and thus the industrial robot 1 cannot work in the rear compartment. Note that within the rear compartment of a four-door automobile body 11, one more industrial robot 1 for rear compartment work can be newly provided, and it works through the rear door opening.

When the industrial robot 1 works in the interiors of a trunk compartment 26, a luggage hatch 27, and a wheel arch 28, as shown in FIG. 8C, part of the work can be done by inserting the upper arm 9 of the industrial robot 1 with the luggage hatch 27 opened about a hinge 29 that has a horizontal axis, but, for the same reason as that illustrated in FIG. 8A, it is difficult for the industrial robot 1 to work on all the regions of the rear of the automobile body 11.

Furthermore, as shown in FIG. 7, a conventional robot has three motors 101, 102, 103 for three dimensionally driving a wrist provided at the free end portion of the upper arm at the end portion of the lower arm. However, as shown in FIG. 7, these three motors 101, 102, 103 are usually disposed laterally in a motor casing 100 provided at the base end portion of the upper arm. Therefore, it is difficult to decrease the robot size in horizontal direction resulting in occurrence of interference with work.

Still further, since a reduction gearbox for the up-and-down axis of a conventional robot is usually directly connected to a shaft of a drive motor, it is difficult for the industrial robot to reduce the size of the lower arm and the load of the motor for the fore-and-aft axis.

SUMMARY OF THE INVENTION

Accordingly, the object of the present invention is to provide a compact industrial robot that can work covering a wide operating range.

According to the present invention, there is provided an industrial robot comprising a base; a revolution portion mounted on said base in such a manner as to be revolutionarily drivable about a revolutionary axis for 360 degrees in either of clockwise and counterclockwise directions; a lower arm angularly drivable about a fore-and-aft axis perpendicular to said revolutionary axis, a base end portion of said lower arm being mounted on said revolution portion in such a manner as to be offset a specific distance from said revolutionary axis; an upper arm rotatably drivable about an up-and-down axis perpendicular to said revolutionary axis and parallel to said fore-and-aft axis, said upper arm being disposed on the opposite side of said lower arm from said revolutionary axis, a base end portion of said upper arm being mounted on a free end portion of said lower arm; and a motor casing provided at the base end portion of said upper arm, three motors for three dimensionally driving a wrist provided at a free end of said upper arm being vertically disposed therein with their axes being in parallel in a vertical plane; the length of said upper arm being less than the vertical height of said free end of said lower arm when said lower arm is in vertical posture, for enabling said upper arm to rotate for 360 degrees in either of said clockwise and counterclockwise directions so that said upper arm and said lower arm are capable of taking symmetrical postures of right-hand and left-hand systems for any position of work; said lower arm having a motor for driving said up-and-down axis at a lower part thereof, a reduction gearbox for the up-and-down axis and a remote power transmission member connected across said motor for driving up-and-down axis and said gearbox.

In accordance with the present invention, a revolution portion is provided on a base, a base end portion of a lower arm is provided in the revolution portion, a base end portion of an upper arm is provided in a free end portion of the lower arm, and the upper arm can be rotatably driven on a side of the lower arm opposite to the revolutionary axis of the revolution portion. Therefore, the axis of the upper arm is offset from the plane containing the revolutionary axis. Consequently, if the upper arm is extended forward while it is positioned on the left side of the lower arm, so-called left-handed operation is enabled, whereas if the upper arm is extended forward while it is positioned on the right side of the lower arm, so-called right-handed operation is enabled. This can increase the operating range of the robot.

Furthermore, in accordance with the present invention, when operation is switched from the above left-handed operation to right-handed operation, the upper arm can be rotated so that the free end portion of the upper arm can pass close to the mounting surface on which the base is fixed. Therefore, there is no need for the free end portion of the upper arm to move further than the mounting surface to switch between left-handed operation and right-handed operation, and thus the installation space of the industrial robot can be made smaller.

Still further, in accordance with the present invention, since three motors are disposed vertically at the base end portion of the upper arm, it is possible to decrease the size in horizontal direction and to avoid interference with work.

Further, in accordance with the present invention, since the drive motor for the upper arm is disposed in lower part of the lower arm and is connected with the reduction gearbox connected to drive the upper arm through a power transmission member, the offset amount between an outer side of the upper arm and an inner side of the lower arm can be decreased and further the load of the motor for fore-and-aft axis can be lowered.

DESCRIPTION OF THE PREFERRED EMBODIMENT

Figure 1:
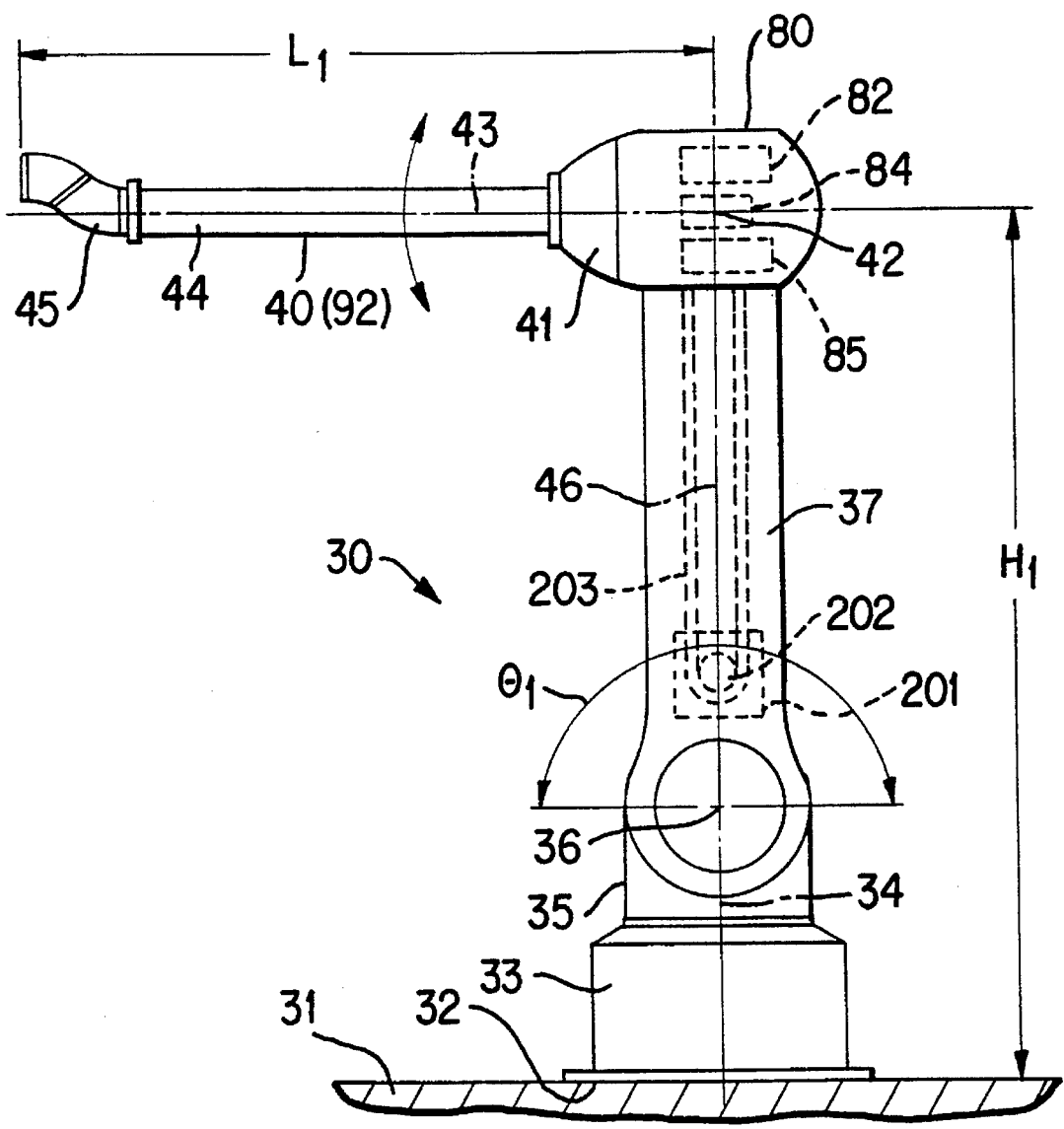
FIG. 1 is a side view of the industrial robot 30 of an embodiment of the present invention.
Figure 2:
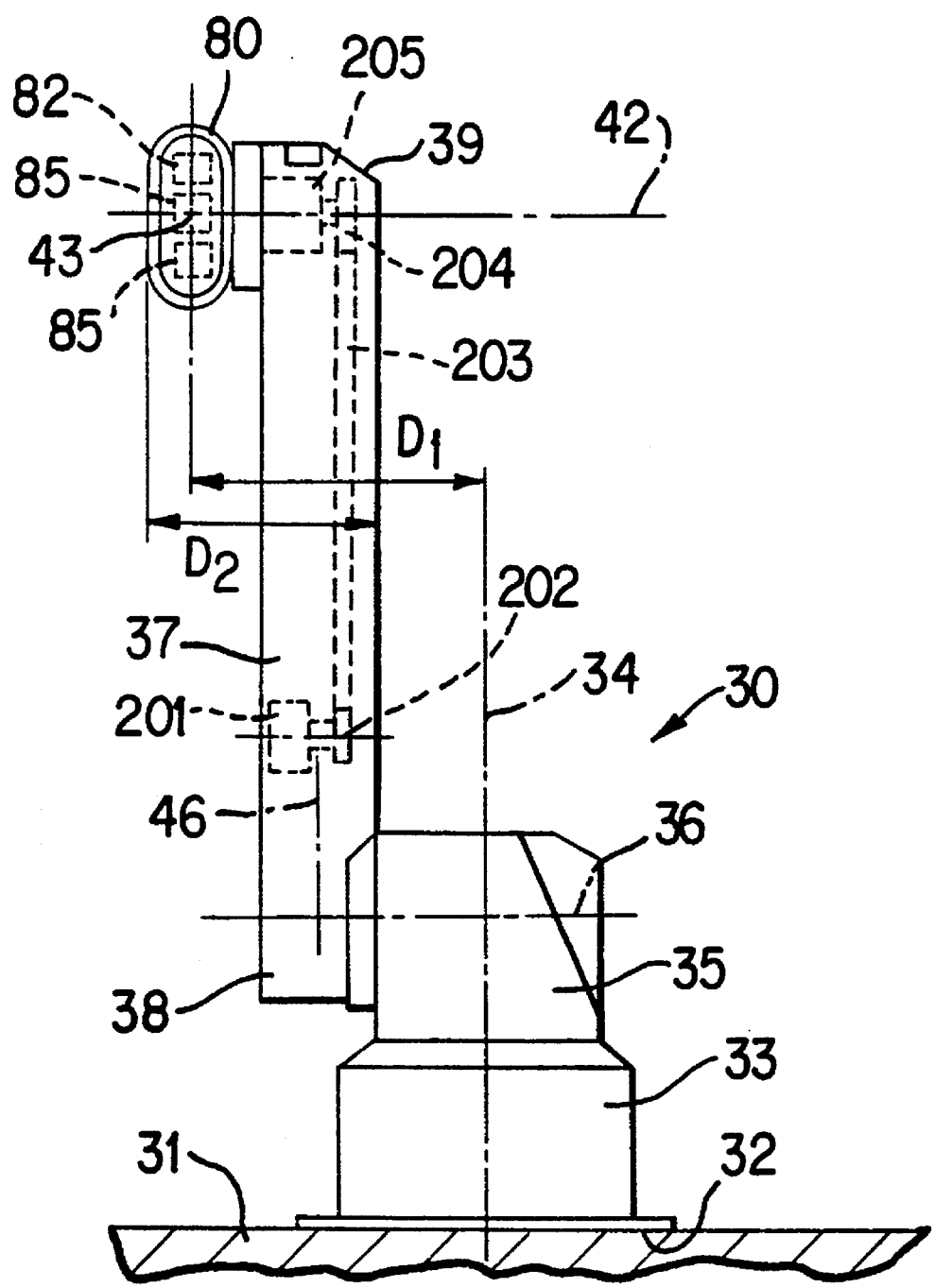
FIG. 2 is a rear view of the industrial robot 30.

The industrial robot 30 of an embodiment of the present invention is shown in FIG. 1, with FIG. 2 showing a back view thereof as seen from the right of FIG. 1. With reference to these figures, a base 33 is fixed to an installation surface 32 such as a floor 31 in the workplace, and a revolution portion 35 is provided so as to be revolutionarily driven about a vertical revolutionary axis 34 in the base 33. A base end portion 38 of a lower arm 37 is provided in the revolution portion 35 so as to be rotatably driven about a horizontal fore-and-aft axis 36 that is perpendicular to the revolutionary axis 34. A base end portion 41 of an upper arm 40, a motor casing 80 is provided. This motor casing 80 is rotatably connected to a free end portion 39 of the lower arm 37 in such a manner that the upper arm 40 is rotatably driven about a horizontal up-and-down axis 42. The up-and-down axis 42 is perpendicular to the revolutionary axis 34 and parallel to the fore-and-aft axis 36. A longitudinal axis of the upper arm 40 is illustrated by reference numeral 43. A wrist 45 with three axes is provided in a free end portion 44 of the upper arm 40, and an operating means for painting or sealing is mounted thereon.

Figure 4:
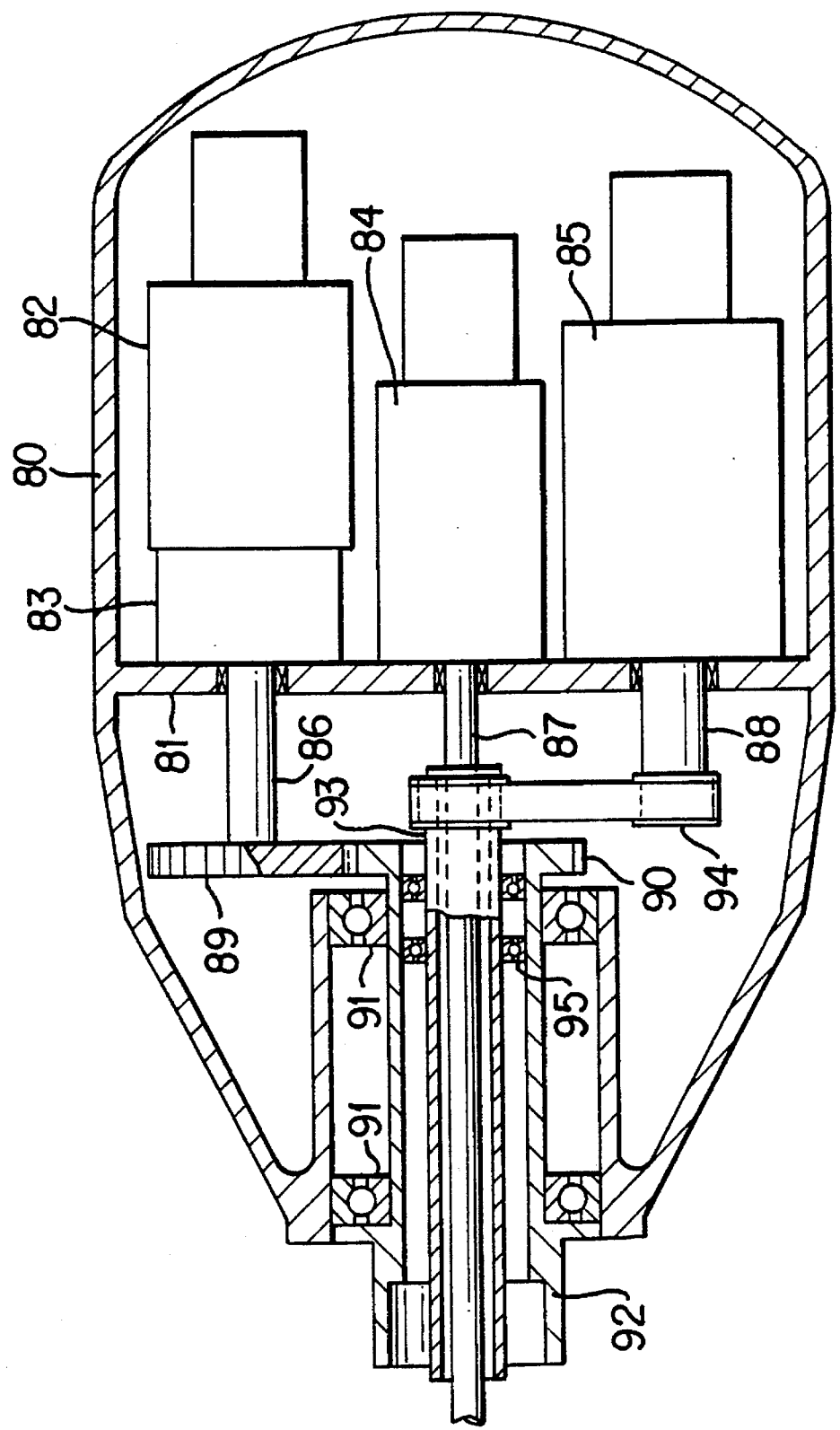
FIG. 4 is an enlarged sectional view of a motor housing provided at the end of the upper arm.

FIG. 4 shows a sectional view of the motor casing 80. In the motor casing 80, three motors 82, 84 and 85 are arranged in vertical direction with centers thereof being in-line. That is, the axes thereof are disposed in parallel in the same vertical plane. The first motor 82 is connected to a gearbox 83 and this gearbox is air-tightly secured to a base wall 81 using a packing (not shown). This base wall 81 and overall casing establish an explosion proof structure. The gearbox is connected to a shaft 86, at the end thereof a gear 89 is secured. This gear 89 engages with a gear 90 provided at the end of a tubular shaft 92 which forms the main part of the upper arm 40. Since the tubular shaft 92 is supported by two bearings 91, it rotates by activation of the motor 82 to swivel the wrist. The second motor 84 drives a shaft 87 to twist the wrist. A tubular shaft 93 which contains the shaft 87 at the center thereof is rotatably supported at the center of the tubular shaft 92 by bearings 95. The tubular shaft 93 for bending the wrist is driven by a third motor 85 through a tension belt 94 which is put across a shaft 88 which is connected to the third motor 85 and the shaft 93.

As described above, since the shaft 92 holds two functions as a power transmission member and a structural member, less diameter and light weight can be realized.

Thus according to this structure, three motors 82, 84 and 85 drive three shafts 92, 87 and 93, respectively. Furthermore, this motor casing 80 has a thin dimension in the lateral direction because the three in-line motors are disposed in vertical direction, resulting in less interference with a work during operation.

The revolution portion 35 can swivel though 360° about the revolutionary axis 34, the lower arm 37 can revolve through an angle $\theta_1 = 180°$ about the fore-and-aft axis 36, and the upper arm 40 can rotate through 360° about the up-and-down axis 42. A case where an axis 46 of the lower arm 37 is parallel to the revolutionary axis 34, namely, the lower arm is in the vertial direction is shown in FIGS. 1 and 2. When the lower arm 37 is erect, the height of the up-and-down axis 42 of the upper arm 40 above the installation surface 32 is indicated by reference $H_1$, and the relationship between this height and the length $L_1$ of the upper arm is such that $H_1 > L_1$. This ensures that rotation of the upper arm 40 about the up-and-down axis 42 in the counterclockwise direction as seen in FIG. 1 enables a switch from left-handed operation to right-handed operation as seen in FIG. 1, and the reverse switch is also possible. Since the switch between left-handed operation and right-handed operation can be done by moving the free end portion 44 of the upper arm 40 close to the installation surface 32, this industrial robot 30 requires a smaller installation space than if the upper arm 40 had to be moved clockwise in FIG. 1 to switch from left-handed operation to right-handed operation, or vice versa.

The longitudinal axis 43 of the upper arm 40 is offset by an amount D1 from the revolutionary axis 34, as is clearly shown in FIG. 2, and when the upper arm 40 is in the position shown in FIGS. 1 and 2 and is moved forward in the extension direction (to the left in FIG. 1), the upper arm 40 is provided on the left side of the lower arm 37 and so-called left-handed operation is enabled thereby. Conversely, when the upper arm 40 is extended to the right in FIG. 1 and is moved forward in the extension direction (to the right in FIG. 1), the upper arm 40 is provided on the right side of the lower arm 37 and so-called right-handed operation is enabled thereby.

Now, turning to FIGS. 1 and 2, a motor 201 for driving the upper arm about the up-and-down axis is disposed in the lower part of the lower arm 37. In the top part of the lower arm, a reduction gearbox 205 for driving the upper arm is provided. Pulleys 202 and 204 are secured to on the shaft of the motor 201 and the shaft of the reduction gearbox 205, respectively, and a belt 203 is mounted on these pulleys to transmit power of the motor 201 to the gearbox 205.

Such structure enables to decrease the offset amount D1 of the longitudinal axis 43 of the upper arm 40 from the revolutionary axis 34 and also an offset amount D2 of an outer side of the upper arm 40 from an inner side of the lower arm 37, because the motor 201 is not directly connected to the reduction gearbox so that the thickness of the lower arm 37 can be decreased.

Furthermore, since the motor 201 which is relatively heavy is disposed at lower part of the lower arm 37, an angular moment of the lower arm can be decreased resulting in decrease of load of the motor for driving the lower arm 37.

In this embodiment, though a belt is used to transmit power from the motor 201 to the remotely located reduction gearbox 205, a driving shaft can also be used.

Figure 5:
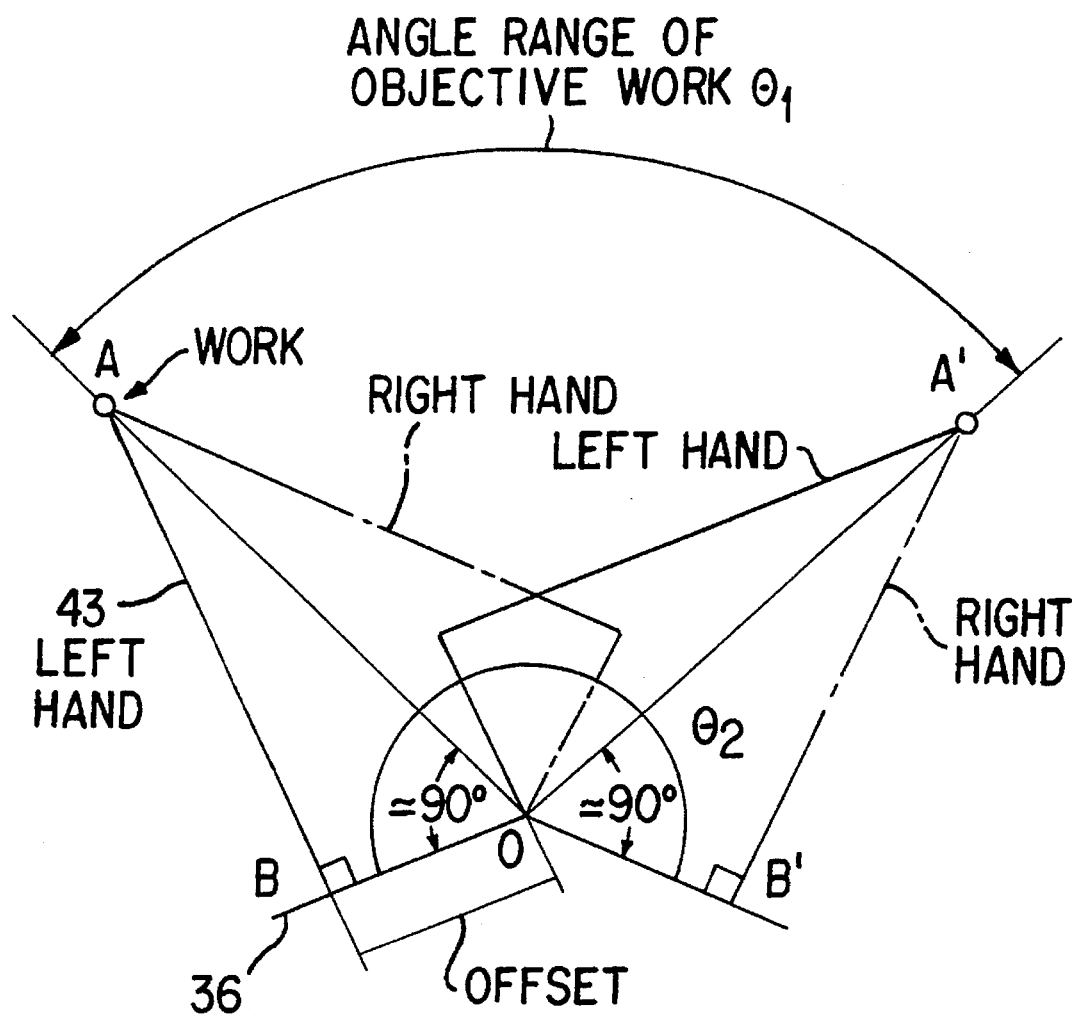
FIG. 5 is an explanatory diagram for illustrating the switching between right-handed operation and left-handed operation.
Figure 6:
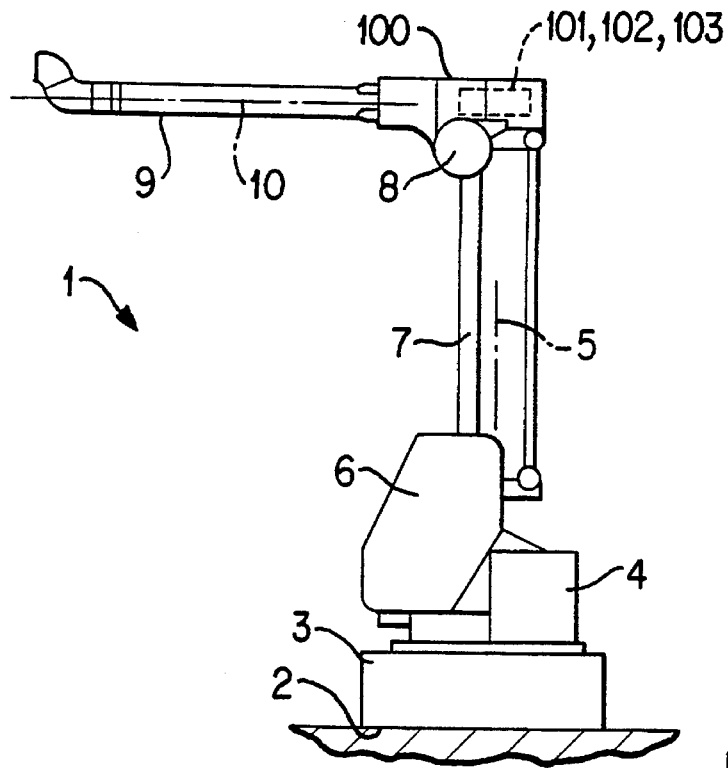
FIG. 6 is a side view of a industrial robot 1 of conventional technology.
Figure 7:
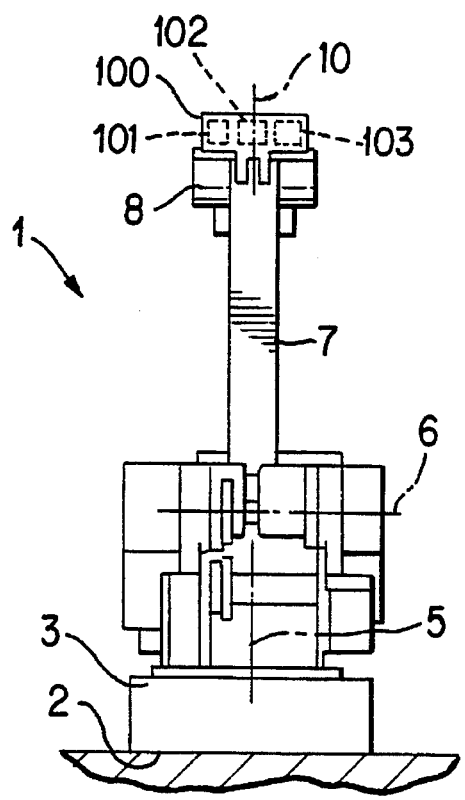
FIG. 7 is a rear view of the conventional technology shown in FIG. 6.
Figure 8A:
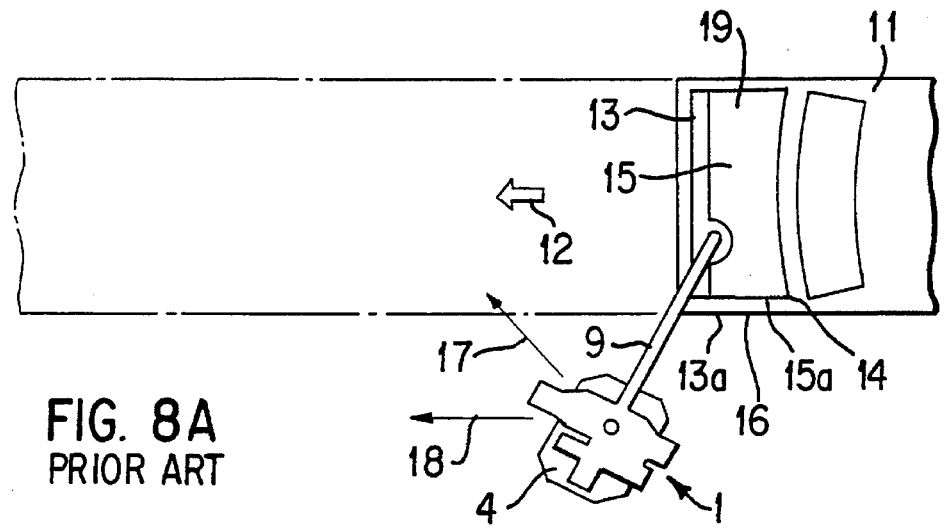
FIGS. 8A to 8C are plan views illustrating the work status of the conventional technology of FIGS. 6 and 7.
Figure 8B:
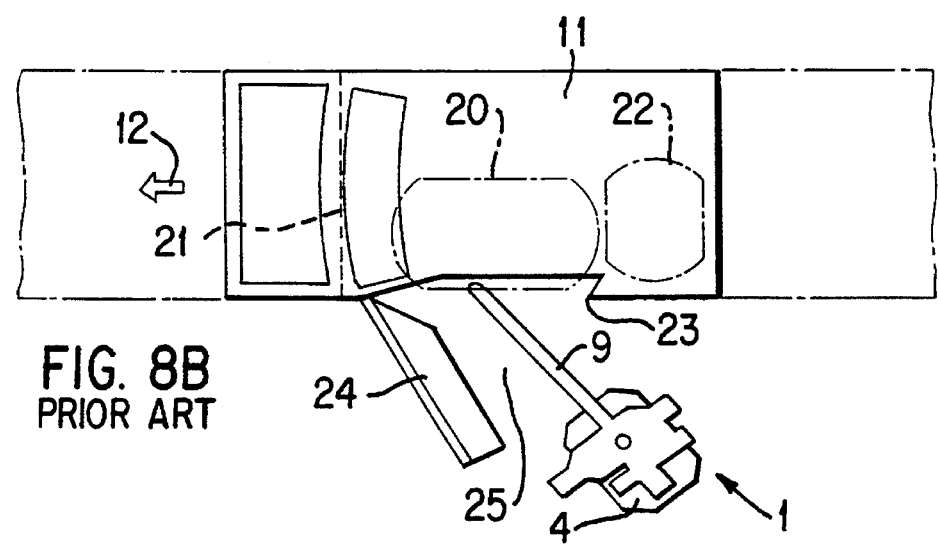
Figure 8C:
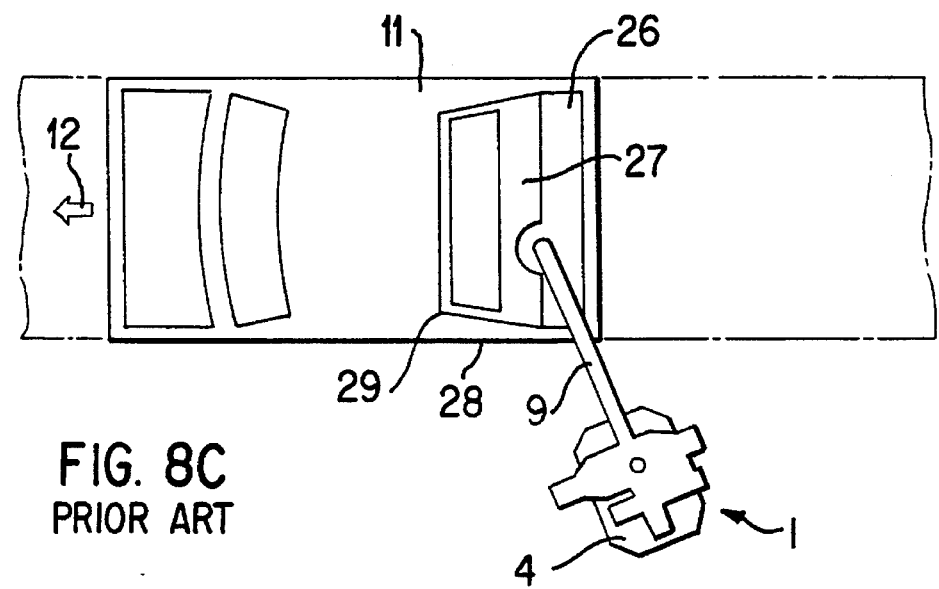

Now, another important advantage of the present invention that the arrangement provides a work angle range of 180° will be explained with reference to FIG. 5. FIG. 5 shows a plan view of some elements of the present invention. In this figure, the points A and A' represent the location of work and the point O is the revolutionary axis of revolution portion 35. The center line AB (43) of the upper arm 40 and the center line OB (36) of the revolutionary axis of the lower arm 37 form a right triangle. In this triangle, since the offset amount OB from the revolutionary axis O of the revolution portion to the center line AB of the upper arm is small (almost negligible) compared to the distance from the work A to the revolutionary axis O of the revolution portion when the work is far from the center O, i.e., when both the upper arm and the lower arm are in horizontal posture, the angle AOB is nearly equal to 90°.

Accordingly, if the angle of objective work AOA' is θ1, the necessary revolution angle θ2 for the revolution portion for performing an operation in the left-hand and right-hand system is expressed as:

$$\theta2 = \theta + 90° \times 2$$

Therefore, if the angle range of the work is 180°, the necessary revolution range of the revolution portion becomes 360°. Thus, the 360° revolution capability of the revolution portion allows symmetric positioning at oppositely disposed work locations.

The operation when the industrial robot 30 of the present invention is used in painting or sealing an automobile body 48 is described below with reference to FIGS. 3A to 3C. The automobile body 48 is moved in the direction of an arrow 49 by a conveyor, and the industrial robot 30 of the present invention is provided to one side of the path of the automobile body 48 as it is moved. Solid lines 71 in FIG. 3A indicate left-handed operation of the industrial robot 30 by which the robot can work within an engine compartment 50 with a hood 51 opened about a hinge 52 having a horizontal axis. The upper arm 40 can enter the engine compartment 50 from the front thereof (the left in FIG. 3A), and the upper arm 40 can work on all parts of the automobile body 48 without being impeded by the hood 51 or a side portion 51a of the engine compartment 50. By switching the operation of the industrial robot 30 to right-handed operation, as indicated by broken lines 72 in FIG. 3A, the robot can be made to work within a wheel arch 53.

Figure 3A:
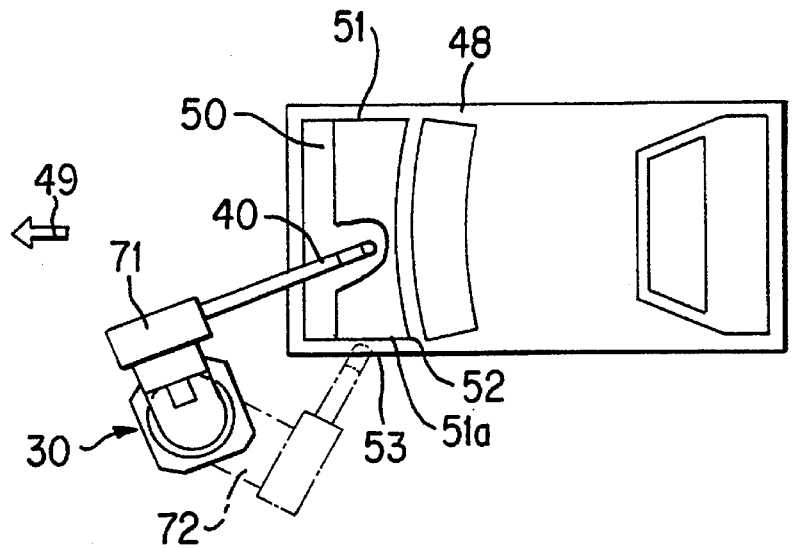
FIGS. 3A to 3C are plan views illustrating the work status of the embodiment of FIGS. 1 and 2.

As shown in FIG. 3A, the robot can do almost all work in the engine compartment 50 and the wheel arch 53 from one position.

Figure 3B:
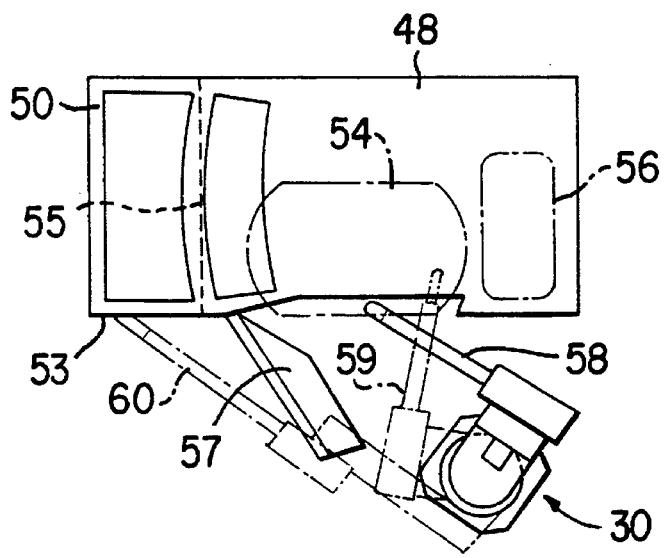

The robot can work on a front floor 54, a dashboard 55, a rear floor 56, and the wheel arch 53 of the automobile body 48 as shown in FIG. 3B. With the industrial robot 30 of the present invention set for right-handed operation as shown by solid lines 58 in FIG. 3B, it can work on the front floor 54 and the dashboard 55; when it is switched to left-handed operation as shown by broken lines 59 in the figure, it can work on the rear floor 56 in a manner that is not possible with an industrial robot of conventional technology. With a front door 57 closed, the upper arm 40 can be extended to work on the wheel arch 53 of the front wheel, as indicated by reference number 60.

Figure 3C:
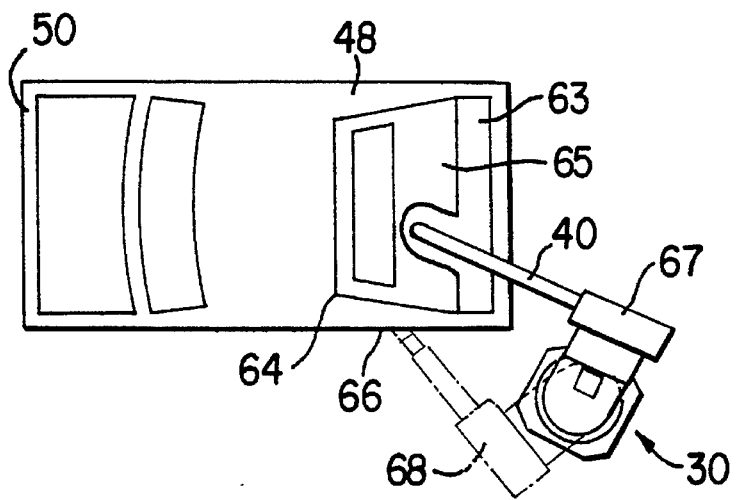

Finally, the robot can work on a trunk compartment 63, a luggage hatch 65 that can be opened about a horizontal hinge 64, and a wheel arch 66 for a rear wheel of the automobile body 48 as shown in FIG. 3C. With the industrial robot 30 of the present invention set for right-handed operation as shown by reference number 67, the upper arm 40 can enter the trunk compartment 63 from the rear thereof (the right in FIG. 3C), so that the automobile body 48 does not impede the upper arm 40, and all parts of the rear of the automobile body 48 can be worked on. When the industrial robot 30 is switched to left-handed operation as shown by reference number 68, the robot can work on the interior of the wheel arch 66.

In this way, work on the entire automobile body can be allocated between a total of six industrial robots on one stage: (a) one robot for working on the engine compartment, hood, and wheel arches, (b) two robots, one either side of the automobile body, for working on the front floor, the dashboard, the rear floor, wheel arches, and the rear compartment of a two-door vehicle, (c) one robot for working on the trunk compartment, the luggage hatch, and wheel arches, and (d) two robots, one either side of the automobile body, for working on the rear compartment of a four-door vehicle, the front and rear doors, and wheel arches.

The present invention should not be taken as limited to an embodiment relating to painting or sealing; other embodiments thereof relating to other applications should be obvious to those skilled in the art.

What is claimed is:

1. An industrial robot comprising:

a base;

a revolution portion mounted on said base in such a manner as to be revolutionarily drivable about a revolutionary axis for 360 degrees in either of clockwise and counterclockwise directions;

a lower arm angularly drivable about a fore-and-aft axis perpendicular to said revolutionary axis, a base end portion of said lower arm being mounted on said revolution portion in such a manner as to be offset a specific distance from said revolutionary axis;

an upper arm rotatably drivable about an up-and-down axis perpendicular to said revolutionary axis and parallel to said fore-and-aft axis, said upper arm being disposed on the opposite side of said lower arm from said revolutionary axis, a base end portion of said upper arm being mounted on a free end portion of said lower arm; and a motor casing provided at the base end portion of said upper arm, three motors for three dimensionally driving a wrist provided at a free end of said upper arm being vertically disposed therein with their axes being in parallel in a vertical plane;

the length of said upper arm being less than the vertical height of said free end of said lower arm when said lower arm is in vertical posture, for enabling said upper arm to rotate for 360 degrees in either of said clockwise and counterclockwise directions so that said upper arm and said lower arm are capable of taking symmetrical postures of right-hand and left-hand systems for any position of work;

said lower arm having a motor for driving said upper arm about the up-and-down axis at a lower part thereof, a reduction gearbox connected to the upper arm and a power transmission member connected across a shaft of said motor for driving the upper arm and a shaft of said gearbox.

2. The industrial robot according to claim 1, wherein said upper arm includes a first tubular shaft driven by a first motor of said three motors, said first tubular shaft includes a second tubular shaft driven by a second motor of said three motors, and said second tubular shaft includes a central shaft driven by a third motor of said three motors, said first tubular shaft, said second tubular shaft and said central shaft, being independently driven to separately activate either one of swivel, twist and bend motions of said wrist, and said first tubular shaft, said second tubular shaft and said central shaft being coaxially disposed.

3. The industrial robot according to claim 1, wherein three motors are air-tightly sealed in the motor casing.

4. The industrial robot according to claim 1, wherein said power trnasmission member is belt.

* * * * *